United States Patent [19]

Studer et al.

[11] 4,263,229
[45] Apr. 21, 1981

[54] METAL COMPLEX DYES OF TRISAZO COMPOUNDS HAVING A 3,5-DINITRO-2-HYDROXYPHENYLAZO GROUP AND TWO OTHER ARYLAZO GROUPS BOUND TO A 1-AMINO-3-HYDROXY-1,3-DIAMINO- OR 1,3-DIHYDROXY-BENZENE NUCLEUS

[76] Inventors: Martin Studer, Bettingen; Heinz Wicki, Basel, both of Switzerland

[21] Appl. No.: 530,718

[22] Filed: Dec. 9, 1974

Related U.S. Application Data

[63] Continuation-in-part of Ser. No. 325,910, Jan. 22, 1973, abandoned, which is a continuation of Ser. No. 34,869, May 5, 1970, abandoned.

[30] Foreign Application Priority Data

May 23, 1969 [CH] Switzerland ............... 7877/69

[51] Int. Cl.³ ............... C09B 45/42; C09B 45/44; C09B 45/46; C09B 45/48
[52] U.S. Cl. ............... 260/145 C; 260/145 A; 260/148; 260/149; 260/169; 260/186; 260/206
[58] Field of Search ............... 260/145 C, 145 A, 169

[56] References Cited

U.S. PATENT DOCUMENTS

| | | | |
|---|---|---|---|
| 2,018,234 | 10/1935 | Smith | 260/169 |
| 2,045,090 | 6/1936 | Lange et al. | 260/145 C |
| 2,111,559 | 3/1938 | Fellmer | 260/145 C |
| 2,175,187 | 10/1939 | Fellmer | 260/145 C |
| 2,183,673 | 12/1939 | Dobler et al. | 260/145 C |
| 2,200,445 | 5/1940 | Fellmer | 260/145 C |
| 2,220,396 | 11/1940 | Crossley et al. | 260/145 C |
| 2,259,735 | 10/1941 | Crossley et al. | 260/145 C |
| 3,189,593 | 6/1965 | Wicki | 260/144 |
| 3,406,160 | 10/1968 | Wicki | 260/145 C |
| 3,787,387 | 1/1974 | Wicki | 260/145 A |

FOREIGN PATENT DOCUMENTS

2163675 7/1973 France ............... 260/145 C

*Primary Examiner*—Floyd D. Higel
*Attorney, Agent, or Firm*—Gerald D. Sharkin; Richard E. Vila; Melvyn M. Kassenoff

[57] ABSTRACT

Compounds of the formula

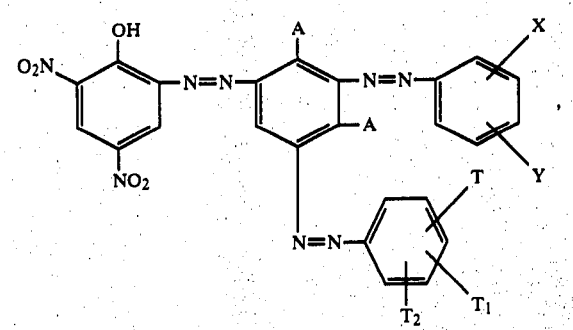

homogeneous and heterogeneous metal complexes thereof, and mixtures of said compounds and complexes, wherein each A is independently hydroxy or amino,
T is carboxy or sulpho,
$T_1$ is hydrogen, nitro, halo, alkyl, substituted alkyl, alkoxy, substituted alkoxy or sulpho,
$T_2$ is hydrogen, nitro, halo, alkyl, substituted alkyl, alkoxy or substituted alkoxy,
X is hydrogen, hydroxy, halo, nitro, alkyl, substituted alkyl, alkoxy, substituted alkoxy or sulpho, and
Y is hydrogen, hydroxy, halo, nitro, alkyl, substituted alkyl, alkoxy, substituted alkoxy or

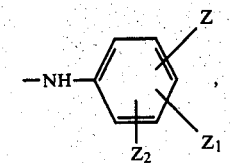

wherein
with the proviso that Y is—

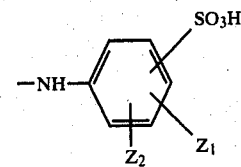

when X is other than sulpho,
Z is hydrogen, carboxy or a sulpho,
$Z_1$ is hydrogen, hydroxy, nitro, alkyl, substituted alkyl, alkoxy, or substituted alkoxy, and
$Z_2$ is hydrogen or nitro.

These dyes are useful for dyeing leather. The dyes display excellent levelling properties, build up well, are soluble in water and are resistant to migration in polyvinyl chloride and crude rubber. The dyeings exhibit good fastness to buffing, light, wet treatments and pressing.

21 Claims, No Drawings

METAL COMPLEX DYES OF TRISAZO COMPOUNDS HAVING A 3,5-DINITRO-2-HYDROXYPHENYLAZO GROUP AND TWO OTHER ARYLAZO GROUPS BOUND TO A 1-AMINO-3-HYDROXY-1,3-DIAMINO- OR 1,3-DIHYDROXY-BENZENE NUCLEUS

This application is a continuation-in-part of application Ser. No. 325,910, filed Jan. 22, 1973, and now abandoned which itself is a continuation of application Ser. No. 34,869, filed May 5, 1970, and now abandoned.

This invention is directed to polyazo dyes and their metal complex compounds, which contain as the basic structural unit a monoazo dye formed from picramic acid and resorcinol, 1,3diaminobenzene or 1-amino-3-hydroxybenzene. They are used for dyeing leather, on which they show superior levelling properties.

The invention thus relates to polyazo dyes, especially to trisazo dyes, their metal complex compounds and mixtures of their metal complex compounds, which in the unmetallized state are of the formula

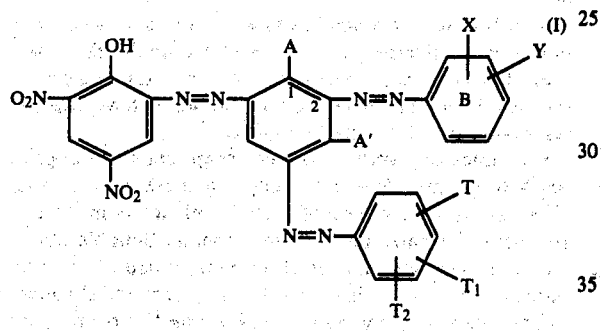

wherein each of A and A' is amino or hydroxy,
  T is carboxy or the sulphonic acid group,
  $T_1$ is hydrogen, nitro, halogen, optionally substituted alkyl or alkoxy or the sulphonic acid group,
  $T_2$ is hydrogen, nitro, halogen or optionally substituted alkyl or alkoxy,
  X is hydrogen, hydroxyl, halogen, nitro, optionally substituted alkyl or alkoxy or the sulphonic acid group, and
  Y is hydrogen, hydroxyl, halogen, nitro, optionally substituted alkyl or alkoxy or

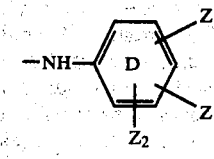

where
  Z is hydrogen, carboxy or the sulphonic acid group,
  $Z_1$ is hydrogen, hydroxyl, nitro, optionally substituted alkyl or alkoxy, and
  $Z_2$ is hydrogen or nitro.
The rings B and/or D in the foregoing formulae bear a sulphonic acid group.

The new trisazo dyes and their metal complex compounds can be produced by coupling 1 mole of a diazo compound of an amine of the formula

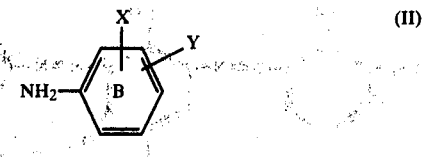

with 1 mole of a coupling component of the formula

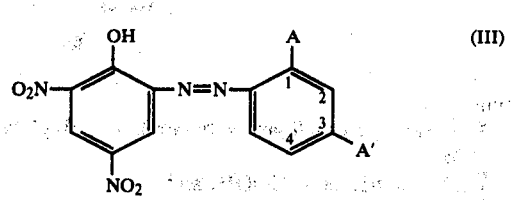

to form the disazo dye of the formula

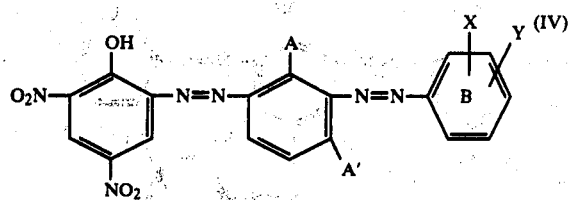

and reacting this with a diazo compound of an amine of the formula

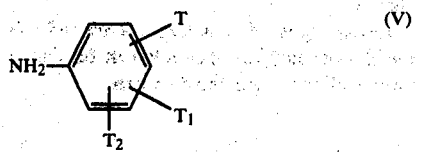

to form the final trisazo dyes which are then treated with metal-donating agents if the metal complex compounds are desired.

Good dyes and their metal complex compounds have in the unmetallized state the formula

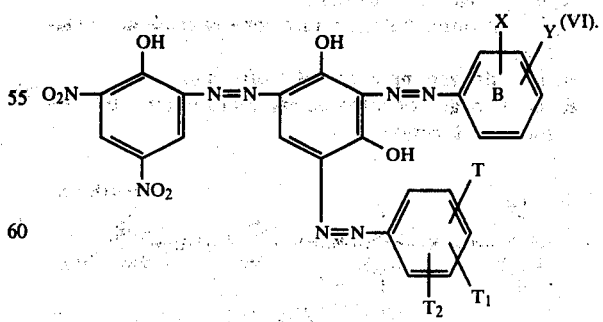

Similarly good dyes and their metal complex compounds correspond in the metal-free state to the formula

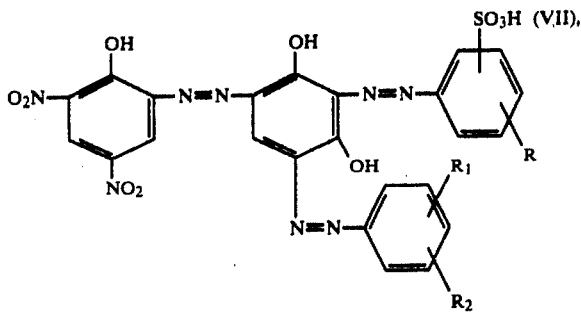

where
R is hydrogen, halogen, nitro or lower alkyl or alkoxy,
$R_1$ is —$SO_3H$ or —COOH, and
$R_2$ is hydrogen, halogen, nitro, lower alkyl or alkoxy or have in the unmetallized state the formula

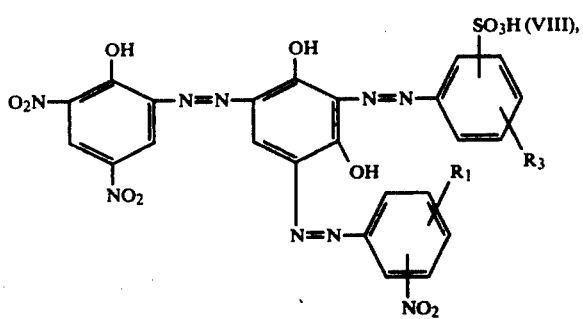

in which $R_1$ is —$SO_3H$ or —COOH and $R_3$ is lower alkoxy.

Good dyes of this type, with which equally good metal complex compounds can be formed, have in the unmetallized state the formula

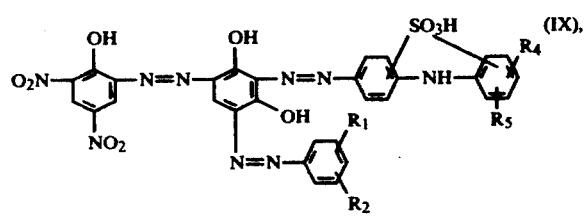

where
$R_1$ is —$SO_3H$ or —COOH,
$R_2$ is hydrogen, halogen, nitro or lower alkyl or alkoxy,
$R_4$ is hydrogen, nitro or —COOH, and
$R_5$ is hydrogen or nitro; or have in the unmetallized state the formula

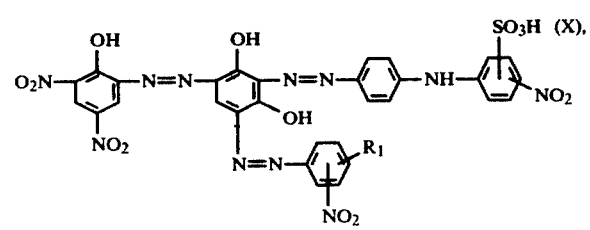

in which $R_1$ is —$SO_3H$ or —COOH.

In comparison with the nearest related metallized dyes, which are those disclosed in Swiss Pat. No. 444,996, the dyes of formula I conforming to this invention, both in the unmetallized and metallized states, are more highly soluble in water, have better level dyeing properties on grain leather and show better resistance to migration in polyvinyl chloride and crude rubber.

The metal complex compounds of the dyes of formula (I) can be formed with chromium, copper, nickel, manganese, cobalt or, more especially, iron compounds. Alternatively, metallization can be effected with a coupling component containing metal, preferably copper, nickel, chromium, manganese, cobalt or iron, which in the unmetallized state is of formula III.

Metallization of the compounds of formulae I and III is best carried out in aqueous medium, with the optional addition of an organic solvent or in an organic solvent alone. The medium is preferably acidic, though it may be neutral or alkaline. It is desirable to conduct the reaction so that an amount of the metal-donating compound containing less than two but at least one equivalent of metal acts upon two equivalents of the azo compound. Preferably, 1:2 metal complex compounds are produced.

Metallization of a single dye of formula I yields homogeneous (symmetrical) 1:2 metal complexes; however, if desired, mixtures of at least two different dyes of formula I can be metallized to obtain heterogeneous (asymmetrical) 1:2 metal complexes.

Examples of suitable copper compounds are cupric sulphate, cupric formate, cupric acetate and cupric chloride, and examples of suitable nickel compounds are nickel formate, acetate and sulphate. Suitable chromium compounds include chromium trioxide, chromic fluoride, chromic sulphate, chromic formate, chromic acetate, chromic potassium sulphate and chromic ammonium sulphate. The chromates, e.g. sodium and potassium chromate and bichromate, are also highly suitable for metallization. Manganese, cobalt and iron formate, acetate and sulphate exemplify suitable compounds of these metals.

The preferred meanings of "halogen" are chlorine and bromine, while "optionally substituted alkyl or alkoxy" denotes radicals bearing 1 to 6 or preferably 1 to 3 carbon atoms, e.g. methyl, ethyl, propyl, isopropyl, methoxy, ethoxy, cyanoethyl, hydroxyethyl, chloromethyl and chloroethyl. Lower alkyl and alkoxy radicals preferably contain 1, 2 or 3 carbon atoms.

The dyes of formula I can be produced by coupling 1 mole of a coupling component of formula III with the diazo compound of an amine of formula II in alkaline medium in the pH region of 7.5 to 12, preferably at pH 8-9, to form a disazo dye of formula (IV), and reacting the latter with the diazo compound of an amine of formula V in acid medium in the pH region of 3 to 7 or preferably at pH 4.5-5.5. The resulting dyes, if not metallized in the process of formation, are then converted into the metal complexes if desired.

The preferred mode of operation of the process is to couple, either simultaneously or successively, a mixture of 0.2-0.8 moles, preferably 0.5 moles, of one diazo compound and 0.8-0.2 moles, preferably 0.5 moles, of a second, different diazo compound of an amine of formula II with 1 mole of a coupling component of formula III to form a mixture of disazo dyes of formula IVa, and to react this with the diazo compound of an amine of formula V.

The unmetallized and metallized dyes of this invention are employed for dyeing and printing leather, either singly or in combination as desired. They have good power of build-up from a neutral to weakly acid medium with notably good levelling properties, and give dyeings of consistent shade on leathers tanned with different tanning agents. On chrome suede they show good buffing fastness. They resist migration in polyvinyl chloride and crepe rubber and possess very good fastness to light, washing, water, perspiration, formaldehyde, pressing and solvents, particularly dry cleaning solvents such as tetrachloroethylene. On leathers of lower affinity, such as chrome-vegetable and chrome-synthetic tanned skins, they build-up well to give deep dyeings. They also have high neutral affinity for leathers of this type.

In the following Examples the parts and percentages are by weight and the temperatures are in degrees centigrade.

EXAMPLE 1

199 Parts (1 mole) of 1-amino-2-hydroxy-3,5-dinitrobenzene are diazotized by the normal method and coupled in soda-alkaline solution with 110 parts (1 mole) of 1,3-dihydroxybenzene at 10°–15° and pH 8–9. 309 Parts (1 mole) of 4-amino-4'-nitro-2'-sulphodiphenylamine are diazotized with sodium nitrite in the normal way in the presence of hydrochloric acid and coupled with the previously obtained monoazo dye at 20° and pH 8–8.5, this pH being maintained by the addition of sodium hydroxide solution. The diazo compound of 218 parts (1 mole) of 1-amino-2-sulpho-4-nitrobenzene is dropped into the alkaline coupling solution in the course of 20 minutes, so that the coupling reaction takes place at a pH between 6 and 6.5. On completion of coupling, the reaction solution is raised to 60°, 144 parts (0.5 moles) of crystallized iron sulphate are added, the temperature is increased further to 95°–100° and this temperature is maintained for 1 hour to effect the metallizing reaction. Subsequently, the metallized dye is precipitated with sodium chloride, isolated and dried. It is obtained as a dark brown powder which dissolves in water with a dark yellow-brown colour and dyes leather in dark yellow-brown shades.

The iron sulphate can be replaced by the equivalent amount of a copper, cobalt-or chromium-donating compound to yield the corresponding copper, cobalt or chromium complexes, which have good properties similar to those of the aforementioned dye.

DYEING EXAMPLE A 100 parts of freshly tanned, neutralized full grain chrome leather are dyed in a drum dyeing machine for 30 minutes at 65° from a bath consisting of 250 parts of water and 1 part of the dye of Example 1. After the addition of 2 parts of an anionic fatliquor based on sulphonated train oil, the leather is treated for a further 30 minutes and then removed, dried and finished. A very level dyeing of dark brown shade is obtained.

DYEING EXAMPLE B

100 Parts of calf suede leather are wetted back in a drum dyeing machine for 4 hours with 1000 parts of water and 2 parts of ammonia. It is then drum dyed in a fresh bath of 500 parts of water, 2 parts of ammonia and 10 parts of the dye of Example 1 for 1 hour and 30 minutes at 65°, after which time 4 parts of 85% formic acid are slowly added to exhaust the bath. The leather is drummed until the dyeing is fully fixed. On removal it is rinsed, dried and finished, and the nap buffed. The resulting suede dyeing is perfectly level and of dark brown shade.

DYEING EXAMPLE C

100 Parts of chrome-vegetable tanned lamb leather are drum dyed for 45 minutes at 55° from a bath of 1000 parts of water, 10 parts of the dye of Example 1 and 1.5 parts of an anionic sperm oil emulsion. Subsequently, 5 parts of 85% formic acid are slowly added and the leather drummed for a further 30 minutes to fix the dyeing. This is followed by drying and finishing. The method gives a dark brown dyeing of good levelness.

DYEING EXAMPLE D

A solution of 20 parts of the dye of Example 1 in 847 parts of water, 150 parts of ethyl glycol and 3 parts of 85% formic acid is applied to the grain side of buffed, combination tanned side leather with a plush pad or by spraying or flow coating. The leather is dried under mild conditions and finished. A dark yellow-brown dyeing is produced which has good fastness properties.

In the following table are set out the substituents and diazo components of further dyes which can be produced in accordance with the procedure of Example 1 and which in the unmetallized state have the formula

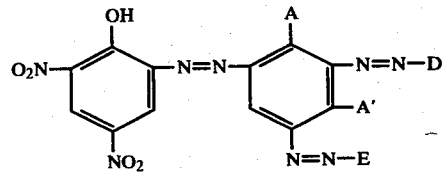

In the five columns to the right are noted the shades of the dyeings on leather obtained with the unmetallized trisazo dyes and their copper, cobalt, chromium and iron complexes.

| | | | | | Shade of dyeings on leather of the unmetallized and metallized dyes | | | | |
|---|---|---|---|---|---|---|---|---|---|
| Ex. No. | A | A' | $H_2N-D$ 1st Diazo component | $E-NH_2$ 2nd Diazo component | unmetallized | copper complex | cobalt complex | chromium complex | iron complex |
| 2 | OH | OH | $H_2N-\langle\bigcirc\rangle-SO_3H$ | $O_2N-\langle\bigcirc\rangle\genfrac{}{}{0pt}{}{SO_3H}{-NH_2}$ | red-brown | red-brown | red-brown | violet-brown | yellow-brown |
| 3 | $NH_2$ | $NH_2$ | $H_2N-\langle\bigcirc\rangle\genfrac{}{}{0pt}{}{SO_3H}{}$ | $HO_3S-\langle\bigcirc\rangle\genfrac{}{}{0pt}{}{NO_2}{-NH_2}$ | red-brown | red-brown | red-brown | violet-brown | yellow-brown |

-continued

| Ex. No. | A | A' | H₂N-D 1st Diazo component | E-NH₂ 2nd Diazo component | Shade of dyeings on leather of the unmetallized and metallized dyes | | | | |
|---|---|---|---|---|---|---|---|---|---|
| | | | | | unmetallized | copper complex | cobalt complex | chromium complex | iron complex |
| 4 | $NH_2$ | $NH_2$ | 2-aminobenzenesulfonic acid ($H_2N$-C₆H₄-$SO_3H$) | 2,5-dichloro-4-amino benzenesulfonic acid | red-brown | red-brown | red-brown | violet-brown | yellow-brown |
| 5 | OH | $NH_2$ | 4-amino-3-methylbenzenesulfonic acid | 2-amino-5-sulfobenzoic acid | red-brown | red-brown | red-brown | violet-brown | yellow-brown |
| 6 | OH | OH | 2-amino-4-sulfotoluene | 2-amino-5-sulfobenzoic acid | red-brown | red-brown | red-brown | violet-brown | yellow-brown |
| 7 | OH | OH | 2-amino-4-methyl-5-sulfobenzene | 2-amino-3,5-disulfobenzene | red-brown | red-brown | red-brown | violet-brown | yellow-brown |
| 8 | OH | OH | 2-amino-3-nitro-5-sulfobenzene | 2-aminobenzoic acid | red-brown | red-brown | red-brown | violet-brown | yellow-brown |
| 9 | OH | OH | 2-amino-3-methoxy-5-sulfobenzene | 4-amino-benzenesulfonic acid | red-brown | red-brown | red-brown | violet-brown | yellow-brown |
| 10 | OH | OH | 2-amino-4-methyl-5-sulfobenzene | 3-aminobenzenesulfonic acid | red-brown | red-brown | red-brown | violet-brown | yellow-brown |
| 11 | OH | OH | $H_2N$-C₆H₄-NH-C₆H₃($NO_2$)-$SO_3H$ | 2-aminobenzenesulfonic acid | red-brown | red-brown | violet-brown | violet-brown | dark-brown |
| 12 | OH | OH | $H_2N$-C₆H₃(Cl)-NH-C₆H₃($NO_2$)-$SO_3H$ | 2-aminobenzoic acid | red-brown | red-brown | violet-brown | violet-brown | dark-brown |
| 13 | OH | OH | $H_2N$-C₆H₃($SO_3H$)-NH-C₆H₄-$NO_2$ | 2-amino-5-nitrobenzoic acid | red-brown | red-brown | violet-brown | violet-brown | dark-brown |
| 14 | OH | OH | $H_2N$-C₆H₃($SO_3H$)-NH-C₆H₄-$OCH_3$ | 2-amino-4-nitro-5-sulfobenzene | red-brown | red-brown | violet-brown | violet-brown | dark-brown |
| 15 | OH | OH | $H_2N$-C₆H₃($SO_3H$)-NH-C₆H₄-OH | 2-amino-3-methoxy-5-nitro-sulfobenzene | red-brown | red-brown | violet-brown | violet-brown | dark-brown |
| 16 | OH | OH | $H_2N$-C₆H₃($SO_3H$)-NH-C₆H₅ | 2-amino-4-nitro-5-sulfobenzene | red-brown | red-brown | violet-brown | violet-brown | dark-brown |
| 17 | OH | OH | $H_2N$-C₆H₃($SO_3H$)-NH-C₆H₅ | 2-amino-4-methyl-5-sulfobenzene | red-brown | red-brown | violet-brown | violet-brown | dark-brown |

-continued

| Ex. No. | A | A' | H₂N-D 1st Diazo component | E-NH₂ 2nd Diazo component | Shade of dyeings on leather of the unmetallized and metallized dyes | | | | |
|---|---|---|---|---|---|---|---|---|---|
| | | | | | unmetall-ized | copper complex | cobalt complex | chromium complex | iron complex |
| 18 | NH₂ | OH | H₂N—C₆H₃(CH₃)—SO₃H | H₃C—C₆H₃(NH₂)—SO₃H | red-brown | red-brown | red-brown | red-brown | yellow-brown |
| 19 | OH | OH | H₂N—C₆H₃(OH)—SO₃H | HO₃S—C₆H₃(CH₃)—NH₂ | red-brown | red-brown | red-brown | red-brown | yellow-brown |
| 20 | OH | OH | H₂N—C₆H₃(Cl)—SO₃H | H₃C—C₆H₂(CH₃)(SO₃H)—NH₂ | red-brown | red-brown | red-brown | red-brown | yellow-brown |
| 21 | OH | OH | H₂N—C₆H₃(SO₃H)—Br | H₃C—C₆H₂(SO₃H)—NH₂ | red-brown | red-brown | red-brown | red-brown | yellow-brown |
| 22 | OH | OH | H₂N—C₆H₃(SO₃H)—NH—C₆H₅ | H₃C—C₆H₂(SO₃H)—NH₂ | red-brown | red-brown | violet-brown | violet-brown | dark-brown |
| 23 | OH | OH | H₂N—C₆H₃(SO₃H)—NH—C₆H₃(SO₃H)—NO₂ | O₂N—C₆H₃(SO₃H)—NH₂ | red-brown | red-brown | violet-brown | violet-brown | dark-brown |
| 24 | OH | OH | H₂N—C₆H₃(C₂H₅)—SO₃H | H₃C—O—C₆H₃(SO₃H)—NH₂ | red-brown | red-brown | red-brown | red-brown | yellow-brown |
| 25 | OH | OH | H₂N—C₆H₃(OC₂H₅)—SO₃H | OCH₃—C₆H₃(SO₃H)—NH₂ | red-brown | red-brown | red-brown | red-brown | yellow-brown |
| 26 | OH | OH | H₂N—C₆H₃(SO₃H)—NH—C₆H₃(NO₂)—CH₃ | OCH₃—C₆H₃(SO₃H)—NH₂ | red-brown | red-brown | violet-brown | violet-brown | dark-brown |
| 27 | OH | OH | H₂N—C₆H₄—NH—C₆H₃(NO₂)—SO₃H | Cl—C₆H₃(SO₃H)—NH₂ | red-brown | red-brown | violet-brown | violet-brown | dark-brown |
| 28 | OH | OH | H₂N—C₆H₄—SO₃H | Cl—C₆H₂(Cl)(SO₃H)—NH₂ | red-brown | red-brown | red-brown | red-brown | yellow-brown |

Formulae of representative dyes of the foregoing Examples are as follows:

EXAMPLE 1

The 1:2 iron complex of the azo dye of the formula

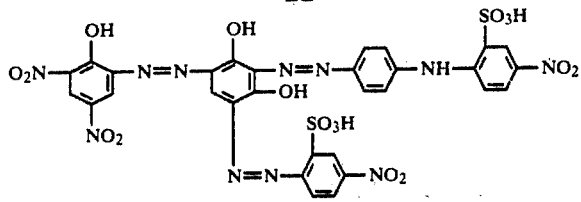

EXAMPLE 11

The 1:2 iron complex of the azo dye of the formula

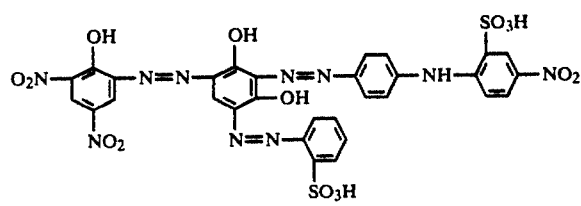

EXAMPLE 16

The 1:2 iron complex of the azo dye of the formula

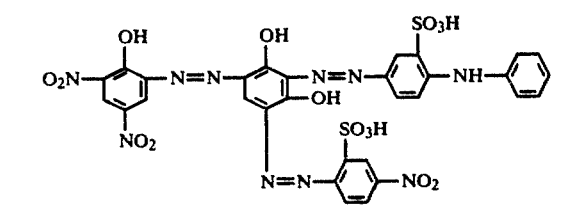

EXAMPLE 17

The 1:2 iron complex of the azo dye of the formula

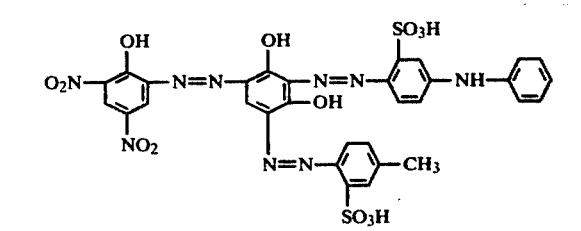

What we claim is:

1. A dye selected from the group consisting of (a) a metal complex of a compound of the formula

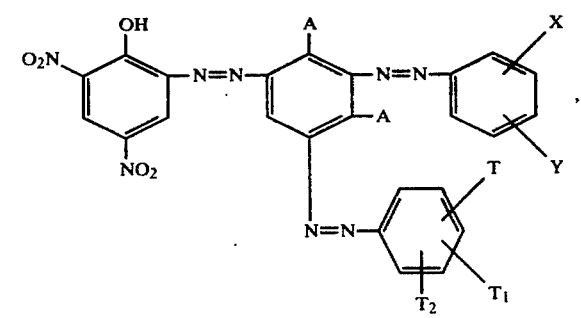

(b) a metal complex of a mixture of compounds of the formula

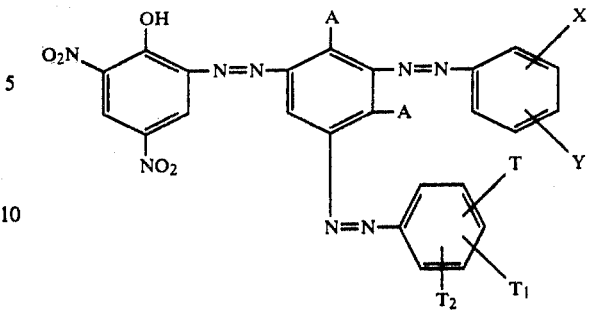

and (c) mixtures thereof, wherein each A is independently amino or hydroxy,

T is carboxy or sulfo, $T_1$ is hydrogen, nitro, halo, alkyl, substituted alkyl, alkoxy, substituted alkoxy or sulfo, $T_2$ is hydrogen, nitro, halo, alkyl, substituted alkyl, alkoxy or substituted alkoxy, X is hydrogen, hydroxy, halo, nitro, alkyl, substituted alkyl, alkoxy, substituted alkoxy or sulfo, and Y is hydrogen, hydroxy, halo, nitro, alkyl, substituted alkyl, alkoxy, substituted alkoxy or

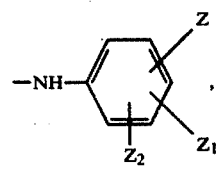

wherein

Z is hydrogen, carboxy or sulfo, $Z_1$ is hydrogen, hydroxy, nitro, alkyl, substituted alkyl, alkoxy or substituted alkoxy, and $Z_2$ is hydrogen or nitro, with the proviso that Y is

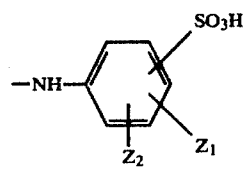

when X is other than sulfo, wherein each alkyl, alkoxy, alkyl chain of substituted alkyl and alkoxy chain of substituted alkoxy independently has 1 to 6 carbon atoms, the substituent of each substituted alkyl and substituted alkoxy is independently cyano, hydroxy or chloro, and each halo is independently chloro or bromo.

2. A dye according to claim 1 selected from the group consisting of (a) a complex of chromium, copper, nickel, manganese, cobalt or iron and a compound of the formula

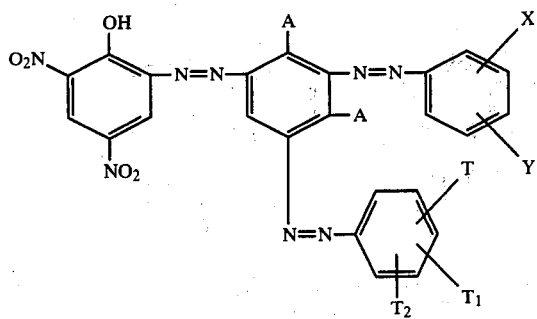

(b) a complex of chromium, copper, nickel, manganese, cobalt or iron and a mixture of compounds of the formula

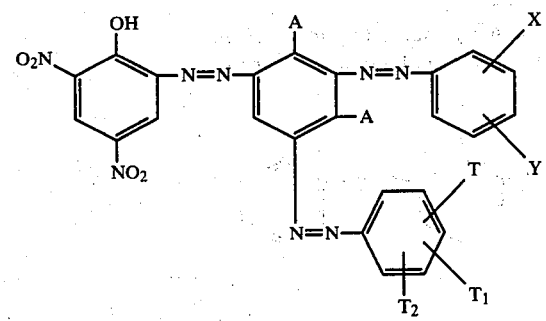

and (c) mixtures thereof.

3. A dye according to claim 2 selected from the group consisting of (a) a 1:2 complex of iron and a compound of the formula

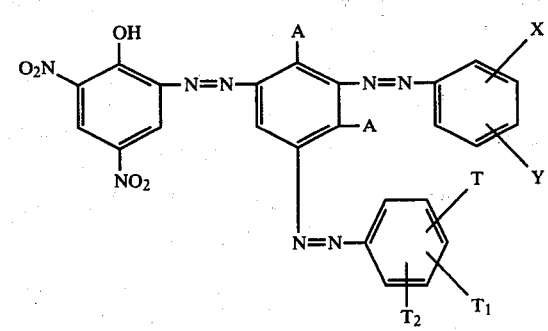

(b) a 1:2 complex of iron and a mixture of compounds of the formula

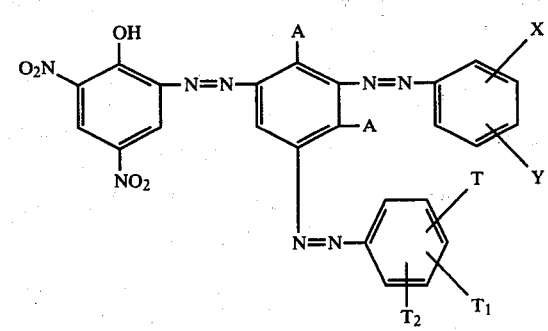

and (c) mixtures thereof.

4. A dye according to claim 2 which is a complex of chromium, copper, nickel, manganese, cobalt or iron and a compound of the formula

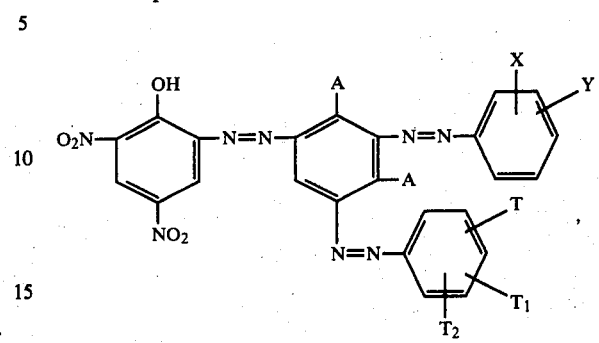

or a mixture of such compounds.

5. A dye according to claim 2 which is a complex of chromium, copper, nickel, manganese, cobalt or iron and a compound of the formula

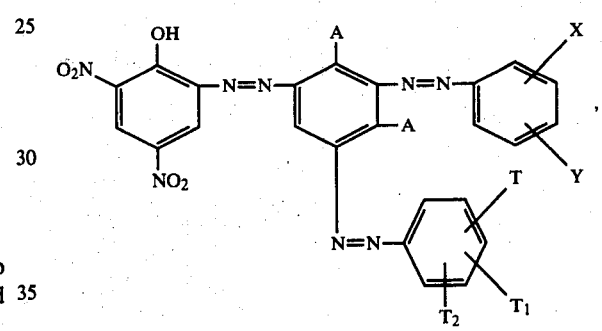

or a mixture of such complexes.

6. A dye according to claim 5 which is a complex of chromium, copper, nickel, manganese, cobalt or iron and a compound of the formula

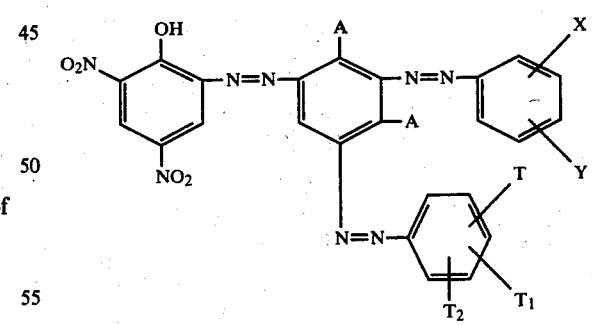

7. A dye according to claim 2 wherein
$T_1$ is hydrogen, nitro, halo, alkyl, monosubstituted alkyl, alkoxy or sulfo,
$T_2$ is hydrogen, nitro, halo, alkyl, monosubstituted alkyl or alkoxy,
X is hydrogen, hydroxy, halo, nitro, alkyl, monosubstituted alkyl, alkoxy or sulfo, and
Y is hydrogen, hydroxy, halo, nitro, alkyl, monosubstituted alkyl, alkoxy or

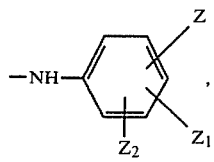

wherein
Z is hydrogen, carboxy or sulfo,
$Z_1$ is hydrogen, hydroxy, nitro, alkyl, monosubstituted alkyl or alkoxy, and
$Z_2$ is hydrogen or nitro,
with the proviso that Y is

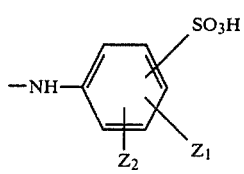

when X is other than sulfo.

8. A dye according to claim 2 wherein said compound is a compound of the formula

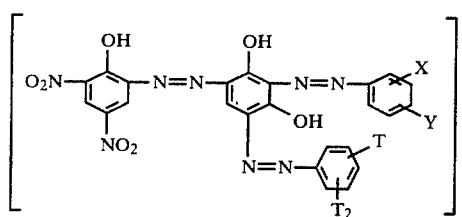

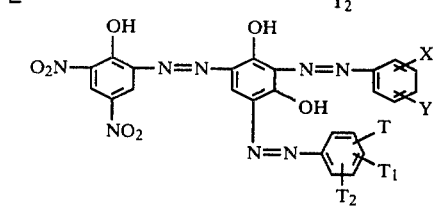

9. A dye according to claim 8 which is a 1:2 complex of iron and a compound of the formula

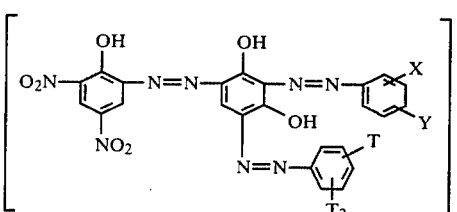

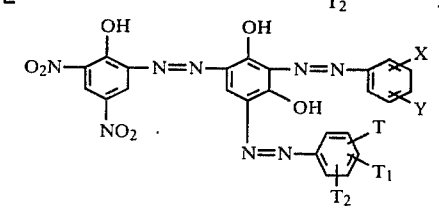

10. A dye according to claim 8 wherein said compound is a compound of the formula

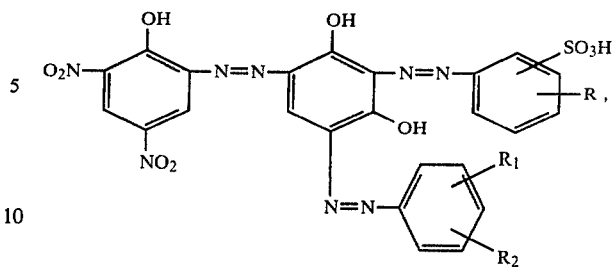

wherein
R is hydrogen, halo, nitro, lower alkyl or lower alkoxy,
$R_1$ is sulfo or carboxy, and
$R_2$ is hydrogen, halo, nitro, lower alkyl or lower alkoxy.

11. A dye according to claim 10 which is a 1:2 complex of iron and a compound of the formula

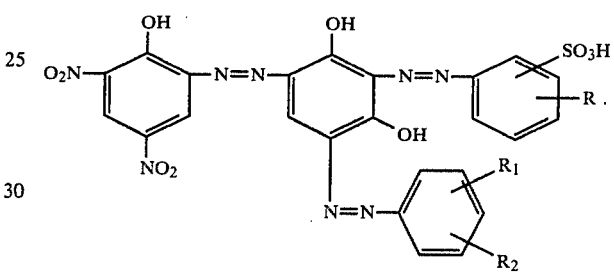

12. A dye according to claim 10 wherein said compound is a compound of the formula

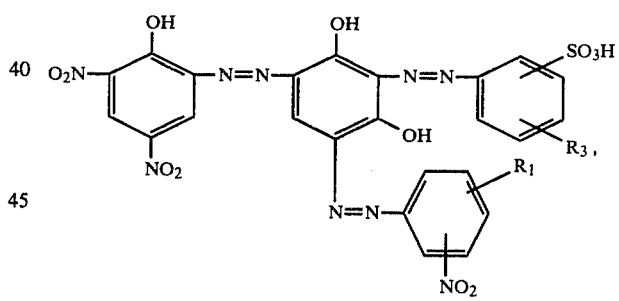

wherein
$R_1$ is sulfo or carboxy, and
$R_3$ is lower alkoxy.

13. A dye according to claim 12 which is a 1:2 complex of iron and a compound of the formula

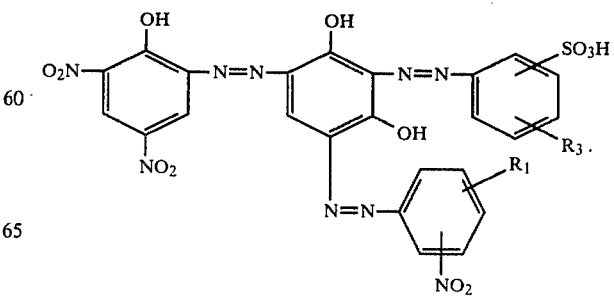

14. A dye according to claim 8 wherein said compound is a compound of the formula

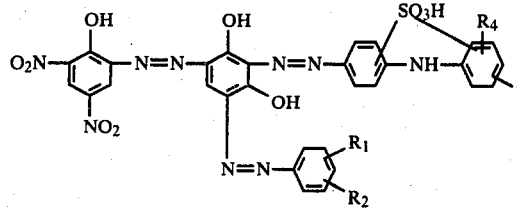

wherein $R_1$ is sulfo or carboxy, $R_2$ is hydrogen, halo, nitro, lower alkyl or lower alkoxy, $R_4$ is hydrogen, nitro or carboxy, with the proviso that $R_4$ is hydrogen or nitro when the —$SO_3H$ group is attached to the ring bearing $R_4$, and $R_5$ is hydrogen or nitro.

15. A dye according to claim 14 which is a 1:2 complex of iron and a compound of the formula

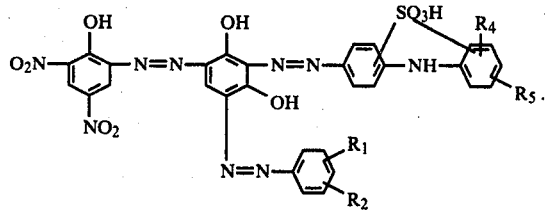

16. A dye according to claim 14 wherein said compound is a compound of the formula

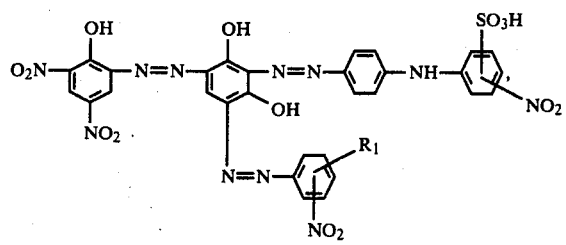

wherein $R_1$ is sulfo or carboxy.

17. A dye according to claim 16 which is a 1:2 complex of iron and a compound of the formula

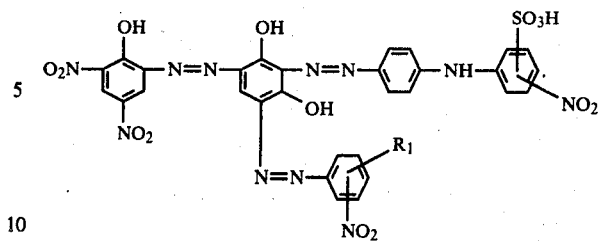

18. The dye according to claim 17 which is the 1:2 complex of iron and the compound of the formula

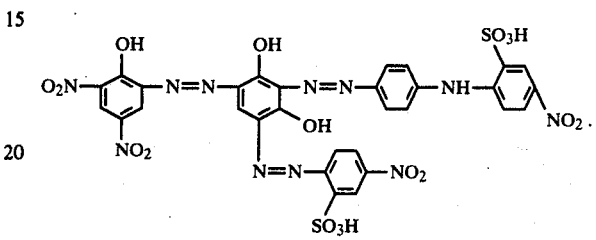

19. The dye according to claim 15 which is the 1:2 complex of iron and the compound of the formula

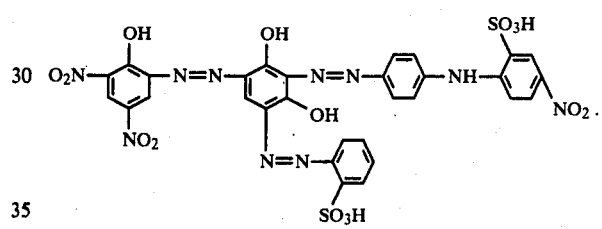

20. The dye according to claim 15 which is the 1:2 complex of iron and the compound of the formula

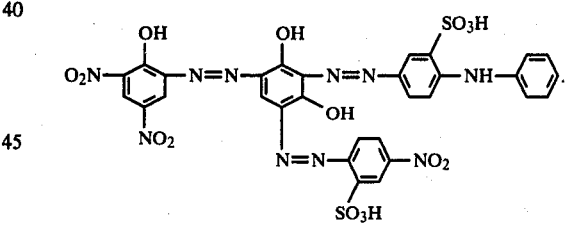

21. The dye according to claim 15 which is the 1:2 complex of iron and the compound of the formula

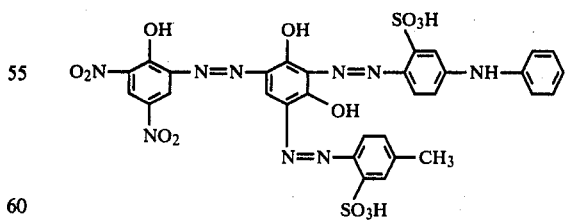

* * * * *